(12) United States Patent
Prasad

(10) Patent No.: US 8,880,951 B2
(45) Date of Patent: Nov. 4, 2014

(54) DETECTION OF DEAD WIDGETS IN SOFTWARE APPLICATIONS

(75) Inventor: Mukul R. Prasad, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 276 days.

(21) Appl. No.: 13/441,402

(22) Filed: Apr. 6, 2012

(65) Prior Publication Data

US 2013/0268810 A1    Oct. 10, 2013

(51) Int. Cl.
*G06F 11/00*    (2006.01)

(52) U.S. Cl.
USPC ......... 714/38.1; 714/38.14; 714/45; 717/124; 717/136

(58) Field of Classification Search
USPC .............. 714/38.1, 38.14, 45; 717/124, 136
See application file for complete search history.

(56) References Cited

U.S. PATENT DOCUMENTS

| | | | |
|---|---|---|---|
| 6,182,085 B1 | 1/2001 | Eichstaedt et al. | 707/104 |
| 6,263,364 B1 | 7/2001 | Najork et al. | 709/217 |
| 6,424,966 B1 | 7/2002 | Meyerzon et al. | 707/3 |
| 7,496,581 B2 | 2/2009 | Nomiyama et al. | 707/100 |
| 7,590,620 B1 | 9/2009 | Pike et al. | 707/3 |
| 7,634,496 B1 | 12/2009 | Evans | 707/102 |
| 7,636,717 B1 | 12/2009 | Gupta et al. | 707/6 |
| 7,752,501 B2 * | 7/2010 | Bak | 714/38.14 |
| 7,761,395 B2 | 7/2010 | Wookey | 706/45 |
| 7,860,849 B1 | 12/2010 | Venkatachary et al. | 707/705 |
| 8,701,090 B2 * | 4/2014 | Zavatone | 717/124 |
| 2004/0103394 A1 | 5/2004 | Manda et al. | 717/126 |
| 2005/0144595 A1 * | 6/2005 | McLean | 717/136 |
| 2006/0206547 A1 | 9/2006 | Kulkarni et al. | 707/205 |
| 2006/0230011 A1 | 10/2006 | Tuttle et al. | 706/62 |
| 2007/0022480 A1 | 1/2007 | Newman | 726/24 |
| 2007/0061877 A1 | 3/2007 | Sima et al. | 762/12 |
| 2007/0083808 A1 | 4/2007 | Setlur et al. | 715/513 |
| 2007/0168832 A1 | 7/2007 | Richardson et al. | 714/758 |
| 2008/0098375 A1 | 4/2008 | Isard | 717/149 |
| 2008/0120336 A1 * | 5/2008 | Bergman et al. | 707/104.1 |
| 2009/0007074 A1 | 1/2009 | Campion et al. | 717/124 |
| 2009/0225082 A1 | 9/2009 | Hargrove et al. | 345/440 |
| 2010/0088668 A1 | 4/2010 | Yoshihama et al. | 717/105 |

(Continued)

FOREIGN PATENT DOCUMENTS

EP    0 415 497    8/1990

OTHER PUBLICATIONS

United States Office Action, U.S. Appl. No. 12/723,568; pp. 19, Mar. 16, 2012.

(Continued)

*Primary Examiner* — Joshua P Lottich
*Assistant Examiner* — Jeison C Arcos
(74) *Attorney, Agent, or Firm* — Baker Botts L.L.P.

(57) ABSTRACT

In one embodiment, a user interface includes at least one instance of each of at least one widget. Recording a plurality of widget interaction instances (WIIs) for the user interface, each WII resulting from a user interaction applied to a particular instance of a particular widget. Clustering the plurality of WIIs based on a text value and a path value of each WII, such that each cluster of WIIs is associated with a particular widget. Determining, for each of at least one cluster of WIIs, whether the particular widget associated with the cluster of WIIs is erroneous based on whether user interactions corresponding to the WIIs in the cluster have produced responses from a software application that includes the user interface.

11 Claims, 6 Drawing Sheets

(56) References Cited

U.S. PATENT DOCUMENTS

| | | | |
|---|---|---|---|
| 2010/0175049 A1 | 7/2010 | Ramsey et al. | 717/115 |
| 2011/0078556 A1 | 3/2011 | Prasad et al. | 715/234 |
| 2011/0099491 A1 | 4/2011 | Abraham et al. | 715/764 |
| 2011/0107153 A1* | 5/2011 | Shufer et al. | 714/45 |
| 2011/0225289 A1 | 9/2011 | Prasad et al. | 709/224 |
| 2011/0270853 A1 | 11/2011 | Curbera et al. | 707/755 |
| 2012/0109927 A1 | 5/2012 | Prasad | 707/709 |
| 2012/0109928 A1 | 5/2012 | Prasad | 707/709 |
| 2012/0109929 A1 | 5/2012 | Prasad | 707/709 |
| 2012/0109930 A1 | 5/2012 | Prasad | 707/709 |
| 2012/0109931 A1 | 5/2012 | Prasad | 707/709 |
| 2012/0110063 A1 | 5/2012 | Prasad | 707/203 |
| 2012/0210236 A1 | 8/2012 | Prasad | 715/738 |

OTHER PUBLICATIONS

United States Finall Office Action, U.S. Appl. No. 12/723,568; pp. 23, Jul. 6, 2012.
United States Office Action, U.S. Appl. No. 12/957,374; pp. 14, Mar. 29, 2012.
United States Office Action, U.S. Appl. No. 12/957,376; pp. 14, Mar. 5, 2012.
United States Office Action, U.S. Appl. No. 12/957,377; pp. 39, Mar. 14, 2012.
United States Final Office Action, U.S. Appl. No. 12/957,377; pp. 38, Aug. 13, 2012.
United States Office Action, U.S. Appl. No. 12/957,379; pp. 28, Sep. 13, 2012.
United States Office Action, U.S. Appl. No. 12/957,384; pp. 26, May 18, 2012.
Mesbah et al.; "Invariant-Based Automatic Testing of AJAX User Interfaces"; SERG; pp. 1-11, 2009.
Roost et al.; Regression Testing Ajax Applications: Coping with Dynamism; SERG; pp. 1-10, 2009.
Halle et al.; "Eliminating Navigation Errors inWeb Applications via Model Checking and Runtime Enforcement of Navigation State Machines"; ACM; pp. 235-244, 2010.
Chau et al.; "Parallel Crawling for Online Social Networks"; ACM; pp. 1283-1284, 2007.
Hafri et al.; "Dominos: A New Web Crawler's Design"; IWAW04; pp. 8, 2004.
Mesbah et al.; "Crawling AJAX by Inferring User Interface State Changes"; Software Engineering Research Group; pp. 16, 2008.
Cho et al.; "Parallel Crawlers"; ACM; pp. 13, 2002.
Mesbah, Ali et al., "Automated Cross-Browser Compatibility Testing" International Conference on Software Engineering (ICSE 2011), 2011.
Choudhary, Shauvik Roy, et al., "WebDiff: Automated Identification of Cross-browser Issues in Web Applications", International Conference on Software Maintenance (ICSM 2010), 2010.
Extended European Search Report; Application No. 11185558.1; pp. 7, Sep. 28, 2012.
Extended European Search Report; Application No. 11186160.5; pp. 7, Sep. 28, 2012.
Wolf; "High Performance Embedded Computing. Architectures, applications, and methodologies"; Referex, XP040425711; pp. 520, 2007.
Extended European Search Report; Application No. 11186926.9; pp. 8, Oct. 4, 2012.
Extended European Search Report; Application No. 11186989.7; pp. 8, Oct. 17, 2012.
Extended European Search Report; Application No. 11186993.9; pp. 7, Sep. 28, 2012.
Extended European Search Report; Application No. 12151883.1; pp. 6, Oct. 8, 2012.
Extended European Search Report; Application No. 11816805.5; pp. 8, Oct. 25, 2012.
United States Final Office Action, U.S. Appl. No. 12/957,379; pp. 36, Feb. 14, 2013.
Oracle; "Oracle Ultra Search User's Guide 10g"; pp. 272, 2003.
Ye et al.; "Crawling Online Social Graphs"; pp. 7, 2000.
United States Final Office Action, U.S. Appl. No. 12/957,384; pp. 33, Jan. 15, 2013.

* cited by examiner

DETECTION OF DEAD WIDGETS IN SOFTWARE APPLICATIONS

TECHNICAL FIELD

This disclosure generally relates to testing and validating the user interface of a software application.

BACKGROUND

There are various types of software applications, one of which is user-interactive software applications. A user-interactive software application is able to interact with a human user. Typically, such an application provides some means (e.g., a user interface) that enables a user to provide input to the application. In response to a user input, the application may produce an appropriate or suitable output to the user. Often, the output is determined based, at least partially, on the input. User-interactive software applications may include, for example, desktop or standalone applications, web applications, and mobile applications.

SUMMARY

In particular embodiments, a user-interactive software application has a graphical user interface (GUI) that may include any number of widgets. Moreover, there may be any number of instances of the same widget included in the GUI. In particular embodiments, a widget is an element in a GUI of a software application that displays an information arrangement changeable by a user of the application. The user may interact with a particular instance of a widget to provide an input to the software application. In response to the user input, the application may produce an appropriate output based, at least partially, on the input.

In particular embodiments, the GUI of a user-interactive software application may be tested and validated to verify whether the widgets included in the GUI function or behave correctly and to detect erroneous widgets. More specifically, in particular embodiments, the GUI may be validated to determine whether there are dead widgets in the GUI. In particular embodiments, a dead widget is one that does not produce any perceptible responses from the application to user interactions with respect to the widget.

In particular embodiments, widget interaction instances (WIIs) may be recorded for a user-interactive software application. In particular embodiments, a WII may result from a user interaction being applied to a particular instance of a particular widget in the GUI of the software application. It may capture data representing or describing the exercising of a particular instance of a particular widget during a particular state of the application and whether or not the exercising produces a state change in the application. In particular embodiments, the WIIs may be clustered based on a text value and a path value of each WII so that each cluster of WIIs may be associated with a particular widget in the GUI. In particular embodiments, for each cluster of WIIs, the particular widget associated with the cluster may be validated (e.g., to determine whether the widget is dead) based on whether the user interactions corresponding to the WIIs in the cluster have produced any responses from the application.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF EXAMPLE EMBODIMENTS

Figure 1:
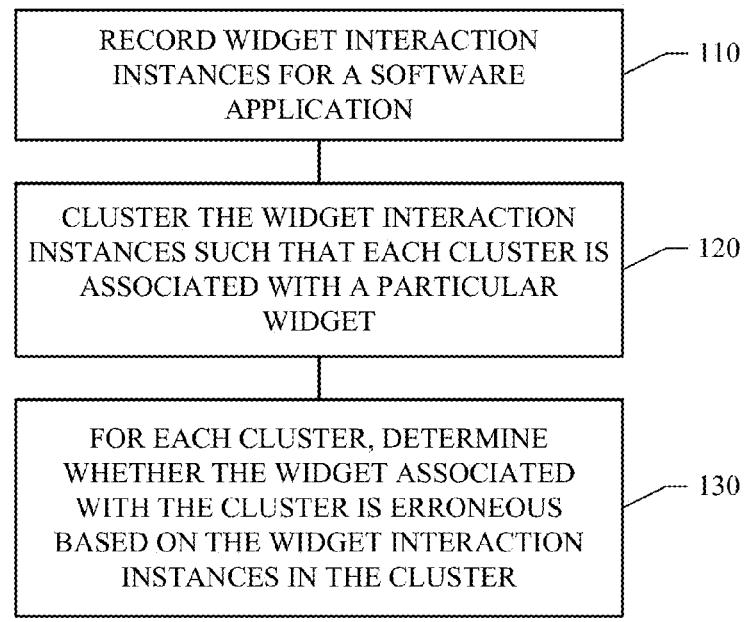
FIG. 1 illustrates an example method for detecting dead widgets in the graphical user interface of a user-interactive software application.

A user-interactive software application enables a human user to interact with the application. Typically, the user may provide input to the application, and in response, the application may produce output to the user. There are various types of user-interactive software applications, such as, for example and without limitation, desktop or standalone applications, web applications, and mobile applications. Often, a user-interactive software application has a user interface through which the user and the application may exchange input and output.

A user interface (UI), in the industrial design field of human-machine interaction, is the space where interactions between humans and machines occur. The goal of interactions between a human, often referred to as a "user", and a machine at the user interface is user's control of the machine and its operations (e.g., through user input) and machine feedback (e.g., through program output). A graphical user interface (GUI) is a type of user interface that allows users to interact with software applications through multimedia objects, such as, for example and without limitation, images, videos, audios, buttons, clickable links, menus, checkboxes, and text fields, rather than purely text commands.

In particular embodiments, a GUI of a user-interactive software application may include any number of widgets. In particular embodiments, a UI widget, or simply widget, is an element in a GUI of a software application that displays an information arrangement changeable by a user of the application. Given a particular widget, there may be any number of instances of the same widget included in the GUI. That is, the same widget may be incorporated or used at different places in the GUI, and each time the widget is used, it is a particular instance of that widget. The user may interact with a particular instance of a widget to provide an input to the software application. In response to the user input, the application may produce an appropriate output based, at least partially, on the input.

Using a web-based software application (e.g., an application that hosts a website) as an example, the GUI of the application may include any number of web pages. In addition, there may be any number of pop-up windows (e.g., for sending notifications or messages to users). A web page or pop-up window may include any number of instances of various types of widgets. For example, a web page may include clickable links or buttons or icons, selectable menu items or check boxes, text fields, etc. A pop-up window may include text fields into which a user may type in texts, clickable buttons, etc. A user may interact with an instance of a widget (e.g., clicking on an instance of a button, typing texts into an instance of a text field, or selecting an instance of a menu item). The user interaction may result in a user input to the application, which may cause a state change in the application in response. That is, the current state of the application may transition to another state in response to a user interaction being applied to an instance of a widget. As an example, by clicking on a link included in a web page, the user interaction with the link may cause the current web page to be replaced with another web page. As another example, by clicking on a button included in a pop-up window, the user interaction with the button may cause the pop-up window to disappear.

From the user's perspective, when there is an output or state change from the application (e.g., in response to a user input through a user interaction with an instance of a widget), the user may perceive or notice some change or difference in the application's output or state. For example, after the current web page is replaced with another web page due to the user clicking on a link included in the former web page, the user shall perceive that a new web page is now displayed in his web browser. After a pop-up window appears, the user shall perceive the pop-up window on his screen.

In particular embodiments, a particular state of the application may correspond to a display screen produced by the application. The display screen may show the information associated with the corresponding state of the application (e.g., the output produced by the application when the application is in the corresponding state). In particular embodiments, when the application transitions from one state to another state, from the user's perspective, the user may perceive a transition from one displaying screen to another display screen, where the two display screens correspond to the two states respectively.

Sometimes, there may be widgets in the GUI of a user-interactive software application that do not function or behave correctly (e.g., widgets with errors). One type of erroneous widget is a "dead" widget. In particular embodiments, a dead widget is one that does not produce any perceptible responses from the application (e.g., from a user's perspective) to user interactions with the widget. More specifically, in particular embodiments, a dead widget never produces any perceptible responses, ever, from the application to user interactions with the widget.

There may be various causes for dead widgets. For example, with a web-based software application, dead widgets may be caused by browser incompatibility. A widget may function correctly in one type of web browser (e.g., Microsoft Internet Explorer) but not in another type of web browser (e.g., Mozilla Firefox). In addition, dead widgets may be caused by incomplete or incorrect implementations, leftover or legacy code that should have been removed but is not, server-side issues, inadequate testing, or mis-classification.

FIG. 1 illustrates an example method for detecting dead widgets in the GUI of a user-interactive software application. What is considered a "dead" widget may vary somewhat from implementation to implementation. For example, with some implementations, an instance of a widget, on a particular GUI screen or in a particular state of an application, is considered "dead" if and only if a user interaction with the instance of the widget produces no state change or screen transition in the application. A widget of the application is classified as "dead" if and only if all instances of that widget, in the application behavior, are dead. Alternatively, with some implementations, a widget of the application is classified as dead if a majority of instances (e.g., above 90% or 95% or 99%) of that widget, in the application behavior, are dead.

In particular embodiments, the method illustrated in FIG. 1 may start at 110, where widget interaction instances (WIIs) for the application are recorded. In particular embodiments, a widget interaction instance (WII), denoted as W, may result from a user interaction with a particular instance of a particular widget in a particular state of the application. The WII captures data representing, describing, or related to exercising (e.g., through the user interaction) of the particular instance of the particular widget in the particular state of the application and whether the exercising produces a state change in the application. With some implementations, the data associated with a WII may be denoted as $W=<t, p, b>$, where t denotes a text value of the instance of the widget, p denotes a path value of the instance of the widget, and b denotes a true or false Boolean value indicating whether the user interaction with the instance of the widget has produced a state change in the application (e.g., true indicating that a state change has occurred and false indicating a state change has not occurred).

Typically, a widget may have some associated textual information. For example, it may have a name, a title, a description, or some "ALT text" (e.g., text that may be displayed in place of a non-textual widget). In particular embodiments, the textual information associated with a widget or an instance of a widget may be used to determine a text value, denoted as t, for the widget or the instance of the widget. For example, with some implementations, a widget's text value may be a combination of all of its available textual information (e.g., a concatenation of its name, description, and ALT text). Alternatively, with some implementations, a widget's text value may be a specific type of its textual information (e.g., its name).

Figure 2:
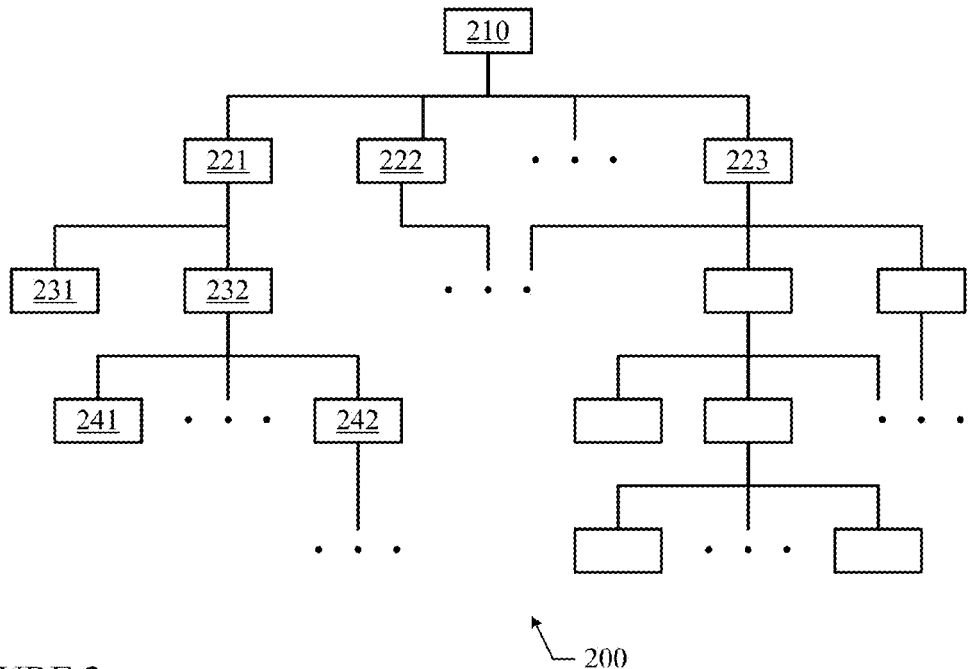
FIG. 2 illustrates an example hierarchy.

In particular embodiments, the elements of a particular screen of a GUI may be arranged in a hierarchy. FIG. 2 illustrates an example hierarchy 200 having a number of nodes respectively representing individual elements, including instances of widgets, of a GUI screen. Using a web-based software application as an example, root node 210 may represent the container element of a particular screen or web page of the web-based application. Nodes 221, 222, 223 may represent various sections of this screen. Each section may include additional elements. For example, node 222 may represent the header section of the web page, and node 221 may represent a body section of the web page. Within the body section represented by node 221, nodes 231, 232, 241 and 242 may represent various individual UI elements (e.g., images, buttons, tables, etc.) included in that body section of the web page.

In particular embodiments, given a particular instance of a particular widget within a particular GUI screen, its path value, denoted as p, may represent or describe the path (e.g., complete path or partial path) within the structural hierarchy of that screen that leads to the node representing the instance of the widget. For example, in FIG. 2, for the instance of the widget represented by node 242, its path value may be 210→221→232→242.

Sometimes, a user-interactive software application, such as a web-based software application, may use Hypertext Markup Language (HTML) to help define or express the hierarchical structure as well as the elements of its GUI. In such cases, with some implementations, the path value of an instance of a widget may be determined based on the XML Path Language (XPath) value of the instance of the widget as expressed using HTML. XPath is a query language for selecting nodes from an XML (Extensible Markup Language)

document and can be applied to HTML documents as well. The path value of an instance of a widget may be expressed as, for example, a sequence of HTML elements indicating the path leading to the node in the HTML hierarchy that represents the instance of the widget.

There are different ways to interact with instances of widgets included in a GUI in order to determine and record whether the interactions have caused any state changes in a user-interactive software application (e.g., recording the WIIs). With some implementations, the recording of the WIIs may be achieved manually. A user may, for example, systematically, interact with each instance of each widget included in each screen of the GUI and record the state change or the lack thereof such interactions has caused. However, this may be very time consuming and may have poor coverage. With some implementations, for a standalone or desktop software application, GUI ripping, which is a method for reverse engineering of GUIs, may help recording the WIIs for the applications.

With some implementations, for a web-based application, dynamic crawling of the application may help recording the WIIs for the application. A web crawler is a computer program that browses and explores the behavior of a web application or website or the content of the World Wide Web in general in a methodical, automated manner or in an orderly fashion. There are many implementations of web crawlers, an example of which is AJAX Crawler, a crawler specifically targeted towards crawling dynamic web applications based on AJAX (Asynchronous Javascript and XML) technologies. With some implementations, an AJAX Crawler may be used to dynamically crawl a web-based software application in order to record the WIIs for the application.

Figure 3:
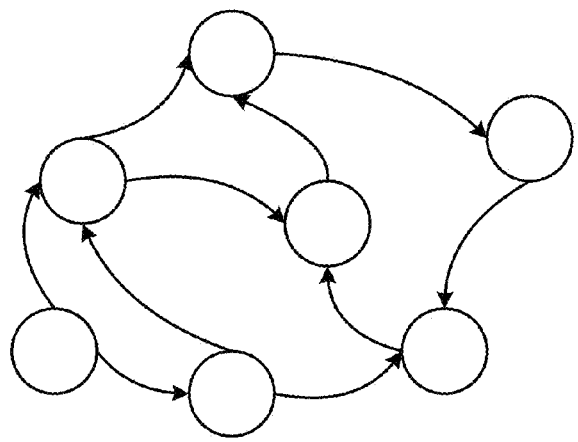
FIG. 3 illustrates an example Screen or State Transition Graph.

With some implementations, with the help of a web crawler, a web-based software application may be automatically and dynamically executed (e.g., each instance of each widget may be systematically executed by simulating a user interaction with the instance of the widget), and the observed application behavior may be recorded in a Screen or State Transition Graph (STG). FIG. 3 illustrates an example STG 300. Each node in STG 300 represents a particular state or screen of the application. If there is a transition from one state or screen to another state or screen of the application, caused by, for example, a user interaction with an instance of a widget in the former state or screen, the transition is represented as a directed edge linking one node representing the former state or screen to another node representing the latter state or screen.

Figure 4:
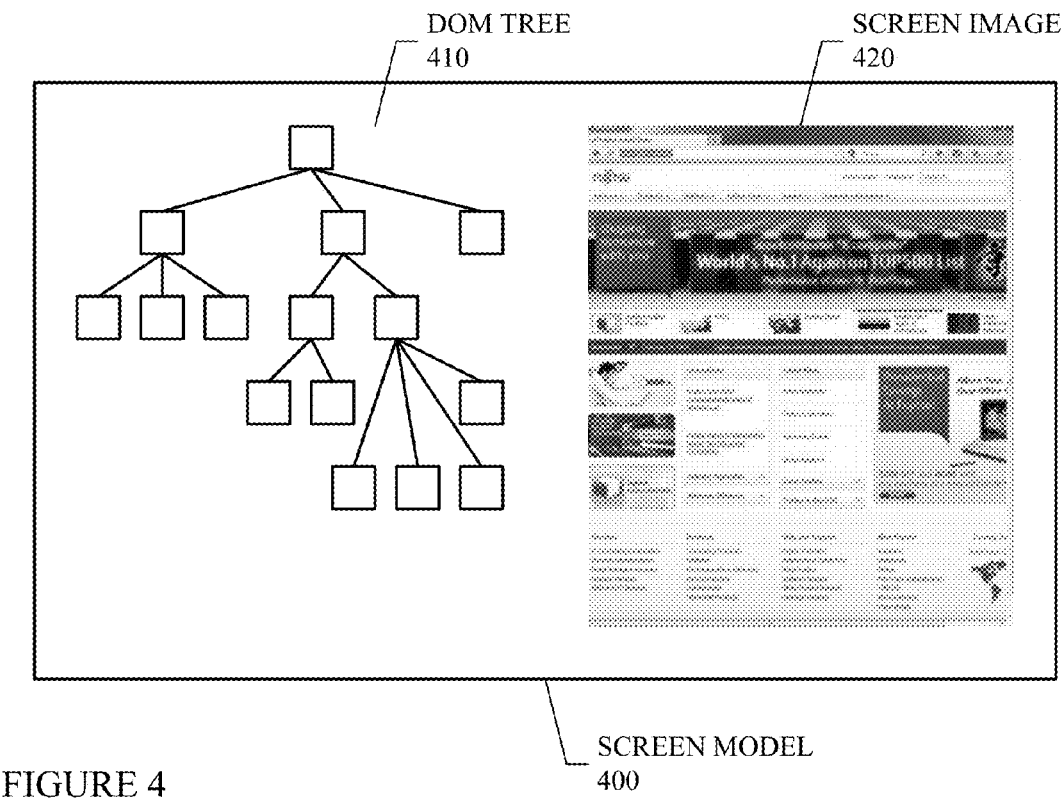
FIG. 4 illustrates an example screen model.

With some implementations, a screen or state model may be recorded for each node while the web-based software application is being crawled. With some implementations, the screen model may include data describing the Document Object Model (DOM) tree as well as an image (e.g., a screenshot) of the screen represented by the corresponding node. FIG. 4 illustrates an example screen model 400 that includes an example DOM tree 410 and an example screen image 420. Other data that may help with the analysis may also be recorded in a screen model. With some implementations, the DOM tree of each screen may be used as the signature of the screen and of the corresponding state. The DOM tree of each state may be analyzed to detect the instances of widgets that may be interacted within that state. These instances of widgets may then be exercised (e.g., by simulating user interactions with them), and the state changes or the lack thereof caused by the exercising of these instances of widgets may be recorded.

In particular embodiments, given a particular instance of a particular widget in a particular state of a user-interactive software application, a WII may be recorded in response to a user interaction with the instance of the widget. With some implementations, the WII may be represented as W=<t, p, b>, where t is the text value of the instance of the widget, p is the path value of the instance of the widget, and b is set to true if the user interaction with the instance of the widget has caused a state change or screen transition from the application and false otherwise. For example, while crawling a web-based software application, each time an instance of a widget is exercised by simulating a user interaction with it, a corresponding WII is recorded. Consequently, crawling the application may produce many WIIs corresponding to many user interactions with various instances of various widgets.

In a GUI, the same widget may be used multiple times in different places of the GUI. In particular embodiments, each time a widget is used in the GUI, it is considered an instance of that widget. Thus, there may be multiple instances of the same widget included in the GUI (e.g., at different places of the GUI). As an example, with an online banking web application, a user may need to log into his or her account to perform some financial transactions or to view account information. Once logged in, the user may have a "LOGOUT" button available to him or her on every screen encountered during the course of using the banking application. In this case, the "LOGOUT" buttons observed on the various screens have the same behavior (e.g. logging the user out from his or her account), and thus, they may be considered instances of the same widget.

When recording the WIIs by exercising instances of widgets in a GUI, if there are multiple instances of the same widget in the GUI, exercising these instances of the widget may result in multiple corresponding WIIs being recorded. Thus, it is possible that multiple WIIs result from exercising multiple instances of the same widget.

In particular embodiments, at 120 of FIG. 1, the recorded WIIs may be clustered such that each cluster of WIIs is associated with a particular widget. In other words, each cluster of WIIs may include any number of WIIs resulting from exercising (e.g., through user interactions) various instances of the same widget, and this is the widget that is associated with the corresponding cluster of WIIs. Note that each cluster of WIIs may include any number of WIIs.

With some implementations, the WIIs may be clustered based on the text value, denoted as t, of each WII. With some implementations, the WIIs may be clustered based on the path value (e.g., the XPath value), denoted as p, of each WII. With some implementations, the WIIs may be clustered based on both the text value and the path value of each WII.

In particular embodiments, the text value of an instance of a widget may identify or describe the instance of the widget. For example, with an online shopping application, a user may add items to his shopping cart. At check-out time, the user may be given a chance to adjust the items in the shopping cart before completing the transaction. The user may remove an item from the shopping cart. To do so, there may be a "DELETE" button placed next to each item in the shopping cart. If the user wishes to remove a particular item, the user may click the "DELETE" button placed next to that item. If there are multiple items in the user's shopping cart, there may be multiple "DELETE" buttons included in the shopping cart screen. Here, the text value of an instance of the "DELETE" button may be "delete". Thus, instances of widgets having the same text value (e.g., "delete") may suggest that they are instances of the same widget. Consequently, the text values of the recorded WIIs may be used to cluster the WIIs. On the other hand, it is possible for different widgets to have the same or similar text values. For example, a "DELETE" button for deleting an item from a shopping cart and a "DELETE"

button for deleting a stored credit card and a "DELETE" button for deleting a file may all be named "delete" and thus may all have the same text value (e.g., "delete"). Yet, they may be considered different widgets, because they are used for deleting different types of objects and thus have different functions and behaviors. In some cases, relying solely on the text values of instances of widgets for clustering the WIIs may not achieve desirable results (e.g., WIIs corresponding to instances of different widgets may be placed in the same cluster).

In particular embodiments, the path value of an instance of a widget may indicate the position of the instance of the widget within the hierarchical structure of a GUI screen, and consequently may identify the context in which the instance of the widget lies (e.g., its relationships with other instances of widgets). Thus, instances of widgets having the same path value may suggest that they are instances of the same widget. Consequently, the path values of the recorded WIIs may be used to cluster the WIIs. On the other hand, it is possible for various instances of the same widget to have slightly different path values. For example, in the shopping cart screen described above, there may be multiple instances of the "DELETE" button respectively placed next to multiple items in the shopping cart. Yet, these instances of the same "DELETE" button may have slightly different path values. In some cases, relying solely on the path values of instances of widgets for clustering the WIIs may not achieve desirable results as well (e.g., WIIs corresponding to instances of the same widget may be placed in different clusters).

In particular embodiments, by considering both text values and path values of instances of widgets when clustering the WIIs, the clustering may achieve more accurate and better results. When two instances of widgets have the same text value as well as the same path value, it is more likely that they are two instances of the same widget. Depending on the requirements of the specific implementations, with some implementations, when clustering the WIIs, the text values may be given more weight of consideration than the path values. Alternatively, with some implementations, the path values may be given more weight of consideration than the path values. Alternatively, with some implementations, the text values and the path values may be given equal or similar weight of consideration.

As an example, to cluster the WIIs using both the text values and the path values, first, the WIIs may be clustered into hashing buckets by hashing the text values of the WIIs. As a result, those WIIs having the same text value are clustered together (e.g., placed into the same hashing bucket). Next, the WIIs may be further clustered by hashing the path values (e.g., the XPath values) of the WIIs. For each hashing bucket obtained during the first hashing based on the text values of the WIIs, the WIIs in the bucket are further hashed using their path values. As a result, if two WIIs have the same text value but different path values, then they are placed in two different clusters. However, if two WIIs have the same text value and the same path value, then they are placed in the same cluster.

Alternatively, as another example, to cluster the WIIs, first, the WIIs may be clustered by hashing the path values (e.g., the XPath values) of the WIIs. As a result, those WIIs having the same path value are placed in the same hashing bucket. Next, the WIIs may be further clustered by hashing the text values of the WIIs.

With some implementations, if two WIIs have the same text value and the same path value, then when the two WIIs are clustered together, they may be stored together as well. For example, suppose that there are two WIIs with the same text value and the same path value, denoted as $W_1 = <t, p, b_1>$ and $W_2 = <t, p, b_2>$ respectively. Before clustering, they may be stored separately. After clustering and they are placed in the same cluster, they may be stored together as $<t, p, (b_1 \vee b_2)>$, replacing the two separately stored WIIs.

As explained above, sometimes, two instances of the same widget may not necessarily have exactly the same path value. Instead, they may have similar, but slightly different path values. Thus, hashing the path values of the WIIs to cluster the WIIs may result in placing WIIs corresponding to instances of the same widget that have slightly different path values into different clusters.

To address this problem, with some implementations, first, the WIIs may be clustered by hashing the text values of the WIIs, so that those WIIs having the same text value are clustered together (e.g., placed into the same hashing bucket). Next, for each hashing bucket thus obtained, the path values of the WIIs in the bucket are compared. If two WIIs have the same or similar path values, then they are clustered together. On the other hand, if two WIIs have sufficiently different path values, then they are placed into different clusters. Consequently, each resulting cluster includes those WIIs having the same text value and the same or similar path values (e.g., XPath values). This suggests that each cluster may include WIIs corresponding to instances of the same widget. The following illustrates an example pseudo code for clustering WIIs.

With some implementations, when comparing the path values of two WIIs, the distance of the two path values may be computed. With some implementations, a path value (e.g., a XPath value) may be treated as a string, and the distance of two path values may be computed using a suitable means for determining the distance between two strings or a suitable inter-XPath distance metric. For example and without limitation, the distance between two path values may be computed based on the Levenshtein Distance, Hamming Distance, Damerau-Levenshtein Distance, or Smith-Waterman Distance.

In particular embodiments, two WIIs, respectively denoted as $W_1 = <t_1, p_1, b_1>$ and $W_2 = <t_2, p_2, b_2>$, are considered siblings and corresponding to two instances of the same widget if and only if: (1) $t_1 = t_2$ and $W_1$ and $W_2$ are the same type of DOM element and Distance $(p_1, p_2) \leq \Delta$ (e.g., Distance may be the Levenshtein Distance between $p_1$ and $p_2$); or (2) they share are a common sibling $W_3$. Here, $\Delta$ denotes a distance threshold. Its value may be set from practical experience. For example, the value of $\Delta$ may be set to 3. With some implementations, the value of $\Delta$ may be used to control, in one aspect, how the WIIs are clustered (e.g., how similar the path values of two WIIs need to be before the two WIIs are clustered together). For example, with a smaller $\Delta$ value (e.g., 1 or 2 or 3), the path values of two WIIs need to be very similarly before the two WIIs are placed in the same cluster. On the other hand, with a larger $\Delta$ value (e.g., 8 or 9 or 10), the path values of two WIIs only need to be mostly similar or somewhat similar before the two WIIs are placed in the same cluster. Again, the value of $\Delta$ may be selected for each specific implementation based on practical needs.

In particular embodiments, based on condition (1) above, only WIIs having the same text value, and thus are placed in the same hashing bucket when the WIIs are first hashed based on their text values, can be siblings. In addition, based on condition (2) above, sibling clusters may be created by first clustering based on condition (1) and then taking the transitive closure of these clusters.

The following illustrates an example pseudo code for clustering WIIs.

```
Cluster ( ) {
    for each W {
        Hash (W)
        // Hashing WIIs into buckets based on the text value of each
        WII.
    }
}
Cluster_Hash (H) {
    for each bucket B in H {
        Cluster_Bucket (B)
        // Clustering each hashing bucket obtained based on hashing text
        values.
    }
}
Cluster_Bucket (B) {
    for each <p, b> in B {
        Cluster (<p, b>) = {<p, b>}
    }
    for each pair <p₁, b₁> and <p₂, b₂> in B {
        if (Distance (p₁, p₂) < Δ)
            then Union (Cluster (<p₁, b₁>), Cluster (<p₂, b₂>))
            // The Union function takes the set union of the clusters of
            <p₁, b₁> and <p₂, b₂>.
    }
}
```

Although recording the WIIs and clustering the WIIs are illustrated as two separate operations in FIG. 1, with some implementations, they may be somewhat combined and performed at the same time. Using a web-based software application as an example, during the crawling of the application, as each WII results from a user interaction being applied to a particular instance of a particular widget and is recorded, the WII may also be placed into the appropriate cluster (e.g., by hashing the WII based on its text value and computing the distances between its path value and the path values of other WIIs having the same text value). When the crawling is completed, the WIIs are both recorded and clustered.

Sometimes, there may be a series of WIIs corresponding to a series of instances of the same widget (e.g., a series of an "ADD COMMENT" button in a web page). The distance between the path values of WIIs that are next to each other in the series may be small, whereas the distance between the path values of two WIIs that are near opposite ends in the series (e.g., one WII near the beginning of the series while another WII near the end of the series) may be large. Nevertheless, they all still correspond to instances of the same widget. If examining the distance between the path values of two WIIs that are near opposite ends in the series on its own, the distance may be sufficiently large so that the two WIIs may be placed into two different clusters. However, since each pair of successive WIIs in this series qualifies as sibling WIIs, condition (2) in the definition of sibling WIIs above ensures that eventually, all the WIIs in this series shall be clustered together.

In particular embodiments, after the WIIs have been clustered, at 130 of FIG. 1, for each cluster of WIIs, the WIIs in the cluster may be examined to determine whether the particular widget associated with that cluster of WIIs is dead. With some implementations, a widget is considered dead if all instances of that widget are dead (e.g., no instance of that widget causes a state or screen transition from the application). Alternatively, with some implementations, a widget is considered dead if a majority (e.g., at least 90% or 95% or 99%) of instances of that widget are dead.

Given a particular cluster of WIIs, the WIIs in the cluster may result from user interactions being applied to various instances of the widget associated with that cluster. For a particular WII, the b value indicates whether a user interaction with the corresponding instance of the widget has produced a state or screen transition from the application (e.g., true indicating a state or screen transition has occurred and false indicating a state or screen transition has not occurred). In particular embodiments, the b values of all the WIIs in the cluster may be examined (e.g., OR'ed together). With some implementations, if the b value of any one of the WIIs in the cluster is true (e.g., the result of the OR operation applied to the b values is true), then the widget associated with the cluster is considered alive, not dead, because at least one instance of the widget has produced a state or screen transition from the application. On the other hand, if the b values of all the WIIs in the cluster are false (e.g., the result of the OR operation applied to the b values is false), then the widget associated with the cluster is considered dead, because all the corresponding instances of the widget are dead (e.g., not producing any state or screen transitions). Alternatively, with some implementations, if the b values of, for example, at least 90% or 95% or 99% of the WIIs in the cluster are false, then the widget associated with the cluster is considered dead.

Figure 5:
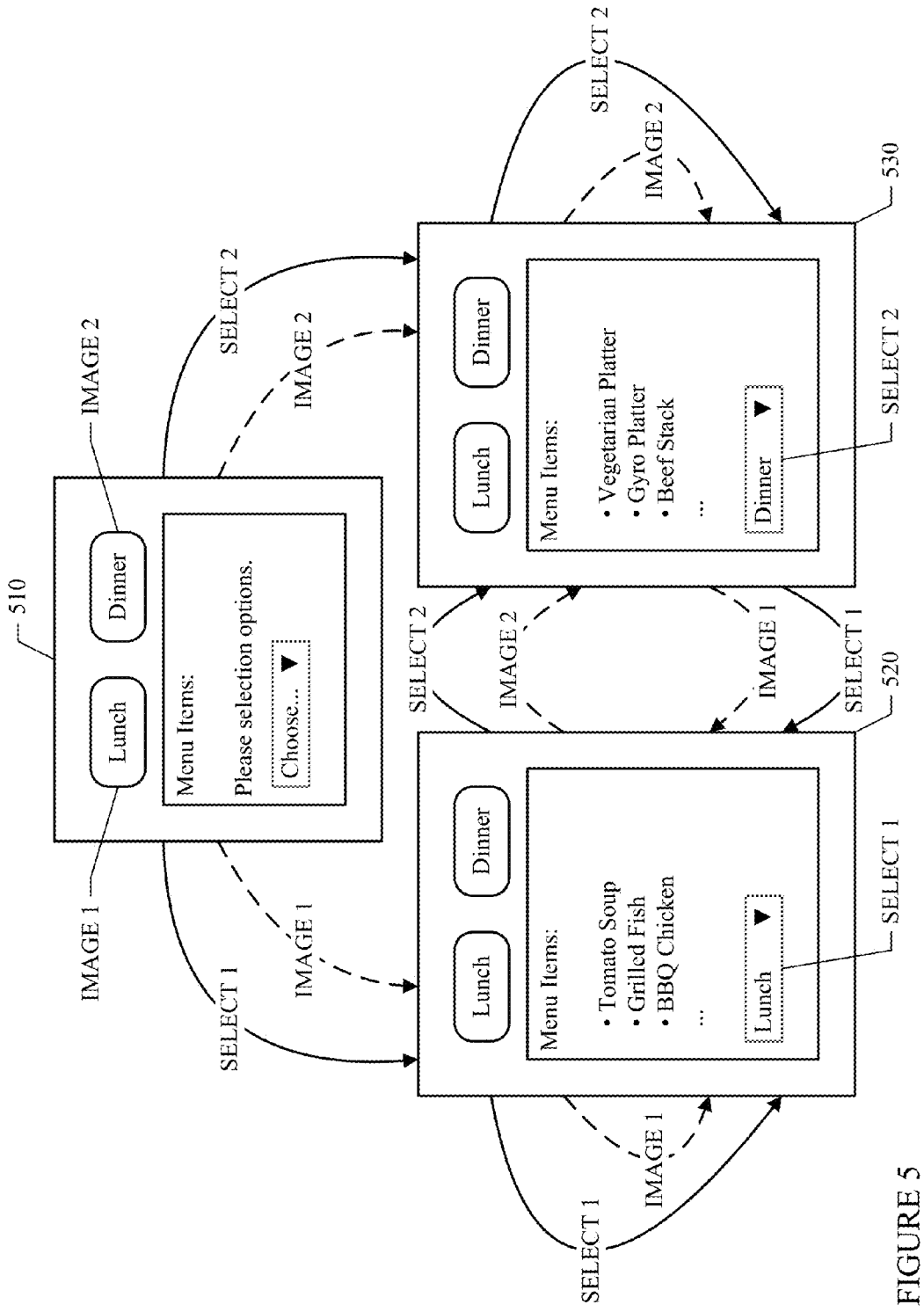
FIG. 5 illustrates an example screen transition graph of an example web-based application.

To further explain the method illustrated in FIG. 1, consider a specific non-limiting example illustrated in FIG. 5, which shows three example screens (e.g., corresponding to three states) of a web-based software application (e.g., an application that hosts a website for a restaurant). In each of screens 510, 520, 530, there are two clickable images: IMAGE 1 and IMAGE 2. In addition, there is a selectable pull-down menu that has two menu items: SELECT 1 and SELECT 2. IMAGE 1 and SELECT 1 both correspond to the lunch menu, while IMAGE 2 and SELECT 2 both correspond to the dinner menu. Supposedly, from any of screens 510, 520, 530, a user may click IMAGE 1 or choose SELECT 1 to view the lunch menu shown in screen 520, and click IMAGE 2 or choose SELECT 2 to view the dinner menu shown in screen 530. Screen 510 may be a home page for the restaurant. FIG. 5 also illustrates the possible transitions between the three screens.

Suppose that the text value of IMAGE 1 is "Lunch", and the text value of IMAGE 2 is "Dinner". Similarly, the text value of SELECT 1 is "Lunch", and the text value of SELECT 2 is "Dinner".

Further suppose that for an instance of a widget, its path value is set to its XPath value. For each of screens 510, 520, 530, the XPath value of IMAGE 1 is "/HTML/BODY/DIV/DIV[2]/IMG[1]", and the XPath value of IMAGE 2 is "/HTML/BODY/DIV/DIV[2]/IMG[2]". The XPath value of IMAGE 1 may be the same for each of screens 510, 520, 530 because the position of IMAGE 1 on each of screens 510, 520, 530 is about the same. Similarly, the XPath value of IMAGE 2 may be the same for each of screens 510, 520, 530 because the position of IMAGE 2 on each of screens 510, 520, 530 is about the same.

Between screen 510 and screens 520, 530, the positions of SELECT 1 and SELECT 2 are slightly different because screens 520, 530 include the lunch and dinner menus, respectively, whereas screen 510 does not display any menus. Thus, for screen 510, the XPath value of SELECT 1 may be "/HTML/BODY/DIV/DIV[7]/SELECT[1]", and the XPath value of SELECT 2 may be "/HTML/BODY/DIV/DIV[7]/SELECT[2]". However, for each of screens 520, 530, the XPath value of SELECT 1 may be "/HTML/BODY/DIV/DIV[8]/SELECT[1]", and the XPath value of SELECT 2 may be "/HTML/BODY/DIV/DIV[8]/SELECT[2]".

When this example web-based application is accessed using Microsoft Internet Explorer, clicking on either IMAGE 1 or IMAGE 2 from any of screens 510, 520, 530 does not produce any results (e.g., no screen transition occurs after a user clicking on either IMAGE 1 or IMAGE 2 from any of screens 510, 520, 530), because IMAGE 1 and IMAGE 2 are images, not buttons, and onclick( ) event on images is not support by Internet Explorer. In other words, IMAGE 1 and IMAGE 2 are dead widgets when the application is accessed using Internet Explorer. In FIG. 5, the screen transitions that should have resulted from user interactions with IMAGE 1 and IMAGE 2 are indicated using dashed arrows. However, these transitions do not occur in Internet Explorer.

Figure 6:
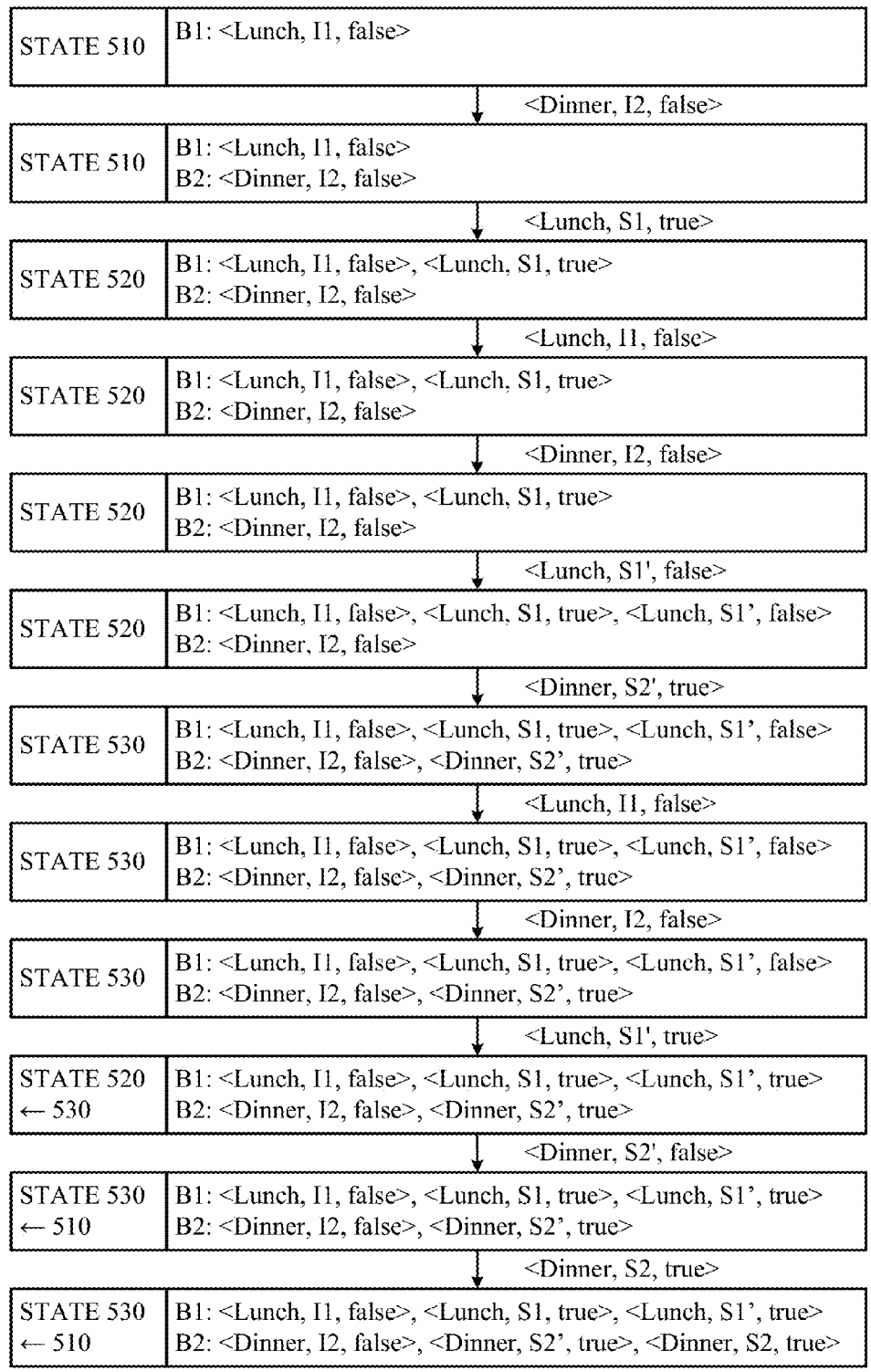
FIG. 6 illustrates an example evolution of widget activity hashing with crawling.

The two dead widgets, IMAGE 1 and IMAGE 2, may be detected by crawling the example web-based application, and recording and clustering WIIs resulted from user interactions with instances of widgets (e.g., as described above in connection with FIG. 1). During the drawling of the example web-based application, each and every instance of each widget in each screen or state may be exercised, and the resulting WIIs may be recorded and incrementally clustered. FIG. 6 illustrates the evolution of widget activity hashing with crawling as applied to the example illustrated in FIG. 5. States 510, 520, 530 of FIG. 6 correspond to screens 510, 520, 530 of FIG. 5, respectively. The symbol "←" indicates backtracking to a previous state. For example, at one point in STATE 520, the crawling may backtrack to STATE 530. The WIIs are hashed based on their text values. Since there are two distinct text values, "Lunch" and "Dinner", among the widgets, the hashing results in two brackets, B1 and B2. The WIIs having "Lunch" as their text values are placed in bucket B1, and the WIIs having "Dinner" as their text values are placed in bucket B2. For IMAGE 1 and IMAGE 2, I1 represents XPath value "/HTML/BODY/DIV/DIV[2]/IMG[1]", and I2 represents XPath value "/HTML/BODY/DIV/DIV[2]/IMG[2]". For SELECT 1 and SELECT 2, 51 represents XPath value "/HTML/BODY/DIV/DIV[7]/SELECT[1]", 51' represents XPath value "/HTML/BODY/DIV/DIV[8]/SELECT[1]", S2 represents XPath value "/HTML/BODY/DIV/DIV[7]/SELECT[2]", and S2' represents XPath value "/HTML/BODY/DIV/DIV [8]/SELECT[2]".

Figure 7:
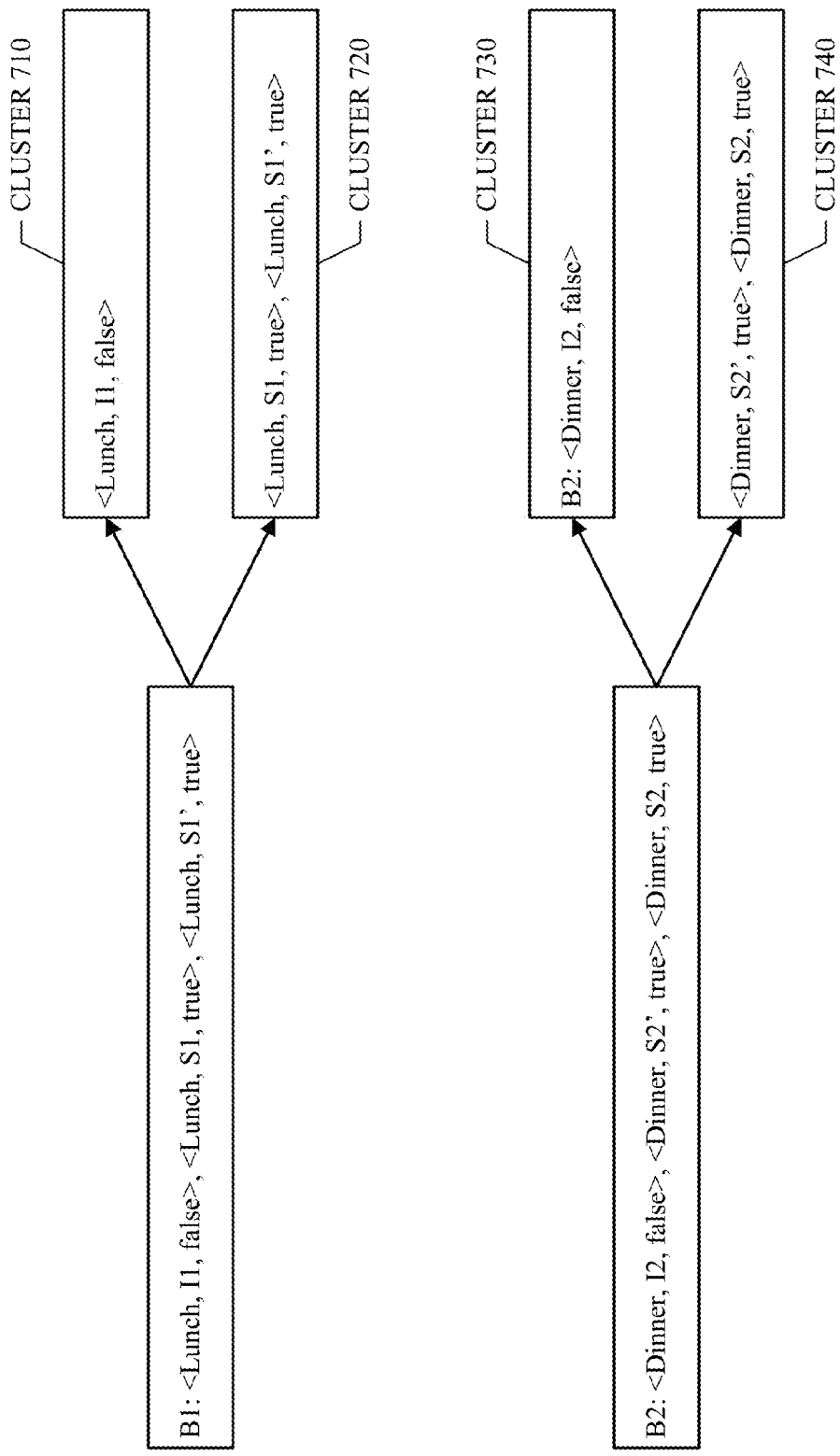
FIG. 7 illustrates an example clustering of hashed widgets.

The WIIs, as hashed into the two buckets, B1 and B2, may then be clustered based on their XPath values, as illustrated in FIG. 7. From bucket B1, the three WIIs are clustered into two separate clusters 710, 720. From bucket B2, the three WIIs are also clustered into two separate clusters 730, 740. Each of clusters 710, 720, 730, 740 is associated with a particular widget. Specifically, cluster 710 is associated with IMAGE 1; cluster 720 is associated with SELECT 1; cluster 730 is associated with IMAGE 2; and cluster 740 is associated with SELECT 2. Given a particular cluster, the b values of the WIIs in the cluster may indicate whether the widget associated with that cluster is dead. As illustrated in FIG. 7, the widgets (i.e., IMAGE 1 and IMAGE 2) associated with clusters 710, 730, respectively, are dead because the WIIs in these clusters all have false as their b values. In contrast, the widgets (i.e., SELECT 1 and SELECT 2) associated with clusters 720, 740, respectively, are alive because the WIIs in these clusters have true as their b values.

Figure 8:
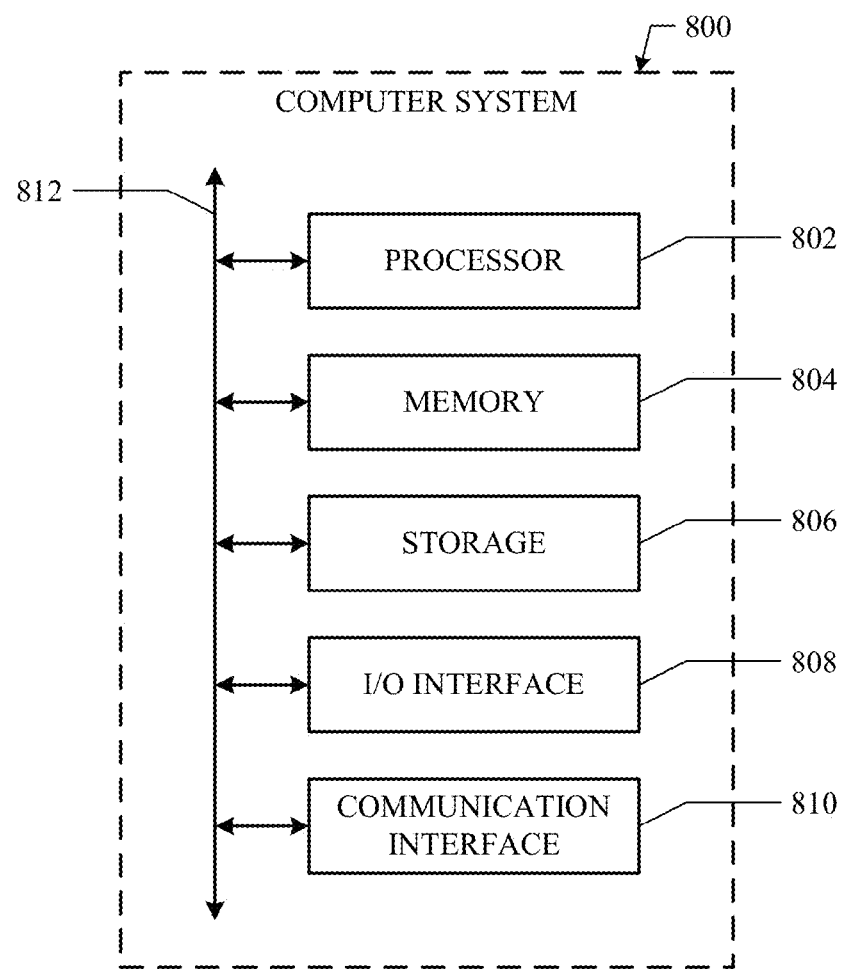
FIG. 8 illustrates an example computing device.

Particular embodiments may be implemented on one or more computer systems. FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802.

Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A system comprising:
a memory comprising instructions executable by one or more processors; and
the one or more processors coupled to the memory and operable to execute the instructions, the instructions causing the one or more processors to perform:
recording a plurality of widget interaction instances (WIIs) for a user interface that includes at least one instance of each of at least one widget, each WII resulting from a user interaction applied to a particular instance of a particular widget;
hashing the plurality of WIIs into at least one hashing bucket based on a text value of each WII;
clustering each hashing bucket of WIIs based on a path value of each WII such that each cluster of WIIs is associated with a particular widget, wherein clustering a particular hashing bucket of WIIs comprises:
for each pair of WIIs in the particular hashing bucket:
computing a distance between a first path value and a second path value of the pair of WIIs, respectively;
placing the pair of WIIs in a same cluster when the distance between the first path value and the second path value is less than or equal to a predetermined threshold; and
placing the pair of WIIs each in a different cluster when the distance between the first path value and the second path value is greater than the predetermined threshold; and
determining, for each of at least one cluster of WIIs, whether the particular widget associated with the cluster of WIIs is erroneous based on whether the user interactions corresponding to the WIIs in the cluster have not produced any perceptible responses from a software application that includes the user interface.

2. The system of claim 1, wherein:
the software application is a web-based application; and
recording the plurality of WIIs for the user interface comprises:
crawling the web-based application to apply user interactions to particular instances of particular widgets included in the user interface; and
recording a WII for each instance of a particular widget to which a user interaction has been applied.

3. The system of claim 1, wherein each WII is represented as <t, p, b>, where t denotes the text value of the WII; p denotes the path value of the WII; and b denotes a Boolean value indicating whether the user interaction from which the WII is resulted has produced a response from the software application.

4. The system of claim 1, wherein the path value of each WII is an XML Path Language (XPath) value of the particular instance of the particular widget to which the user interaction recorded by the WII applies.

5. A method, performed by at least one computing system, comprising:
recording a plurality of widget interaction instances (WIIs) for a user interface that includes at least one instance of each of at least one widget, each WII resulting from a user interaction applied to a particular instance of a particular widget;
hashing the plurality of WIIs into at least one hashing bucket based on a text value of each WII;
clustering each hashing bucket of WIIs based on a path value of each WII such that each cluster of WIIs is associated with a particular widget, wherein clustering a particular hashing bucket of WIIs comprises:
for each pair of WIIs in the particular hashing bucket:
computing a distance between a first path value and a second path value of the pair of WIIs, respectively;
placing the pair of WIIs in a same cluster when the distance between the first path value and the second path value is less than or equal to a predetermined threshold; and
placing the pair of WIIs each in a different cluster when the distance between the first path value and the second path value is greater than the predetermined threshold; and
determining, for each of at least one cluster of WIIs, whether the particular widget associated with the cluster of WIIs is erroneous based on whether the user interactions corresponding to the WIIs in the cluster have not produced any perceptible responses from a software application that includes the user interface.

6. The method of claim 5, wherein:
the software application is a web-based application; and
recording the plurality of WIIs for the user interface comprises:
crawling the web-based application to apply user interactions to particular instances of particular widgets included in the user interface; and
recording a WIT for each instance of a particular widget to which a user interaction has been applied.

7. The method of claim 5, wherein each WIT is represented as <t, p, b>, where t denotes the text value of the WIT; p denotes the path value of the WII, and b denotes a Boolean value indicating whether the user interaction from which the WIT is resulted has produced a response from the software application.

8. The method of claim 5, wherein the path value of each WIT is an XML Path Language (XPath) value of the particular instance of the particular widget to which the user interaction recorded by the WIT applies.

9. One or more computer-readable non-transitory storage media embodying software operable, when executed by at least one computer system, to perform:
recording a plurality of widget interaction instances (WIIs) for a user interface that includes at least one instance of each of at least one widget, each WII resulting from a user interaction applied to a particular instance of a particular widget;
hashing the plurality of WIIs into at least one hashing bucket based on a text value of each WII;
clustering each hashing bucket of WIIs based on a path value of each WII such that each cluster of WIIs is associated with a particular widget, wherein clustering a particular hashing bucket of WIIs comprises:
for each pair of WIIs in the particular hashing bucket:
computing a distance between a first path value and a second path value of the pair of WIIs, respectively;
placing the pair of WIIs in a same cluster when the distance between the first path value and the second path value is less than or equal to a predetermined threshold; and
placing the pair of WIIs each in a different cluster when the distance between the first path value and the second path value is greater than the predetermined threshold; and
determining, for each of at least one cluster of WIIs, whether the particular widget associated with the cluster of WIIs is erroneous based on whether the user interactions corresponding to the WIIs in the cluster have not produced any perceptible responses from a software application that includes the user interface.

10. The media embodying the software of claim 9, wherein:
the software application is a web-based application; and
recording the plurality of WIIs for the user interface comprises:
crawling the web-based application to apply user interactions to particular instances of particular widgets included in the user interface; and
recording a WII for each instance of a particular widget to which a user interaction has been applied.

11. The media embodying the software of claim 9, wherein each WII is represented as <t, p, b>, where t denotes the text value of the WII; p denotes the path value of the WII; and b denotes a Boolean value indicating whether the user interaction from which the WII is resulted has produced a response from the software application.

* * * * *

UNITED STATES PATENT AND TRADEMARK OFFICE
CERTIFICATE OF CORRECTION

PATENT NO. : 8,880,951 B2
APPLICATION NO. : 13/441402
DATED : November 4, 2014
INVENTOR(S) : Mukul R. Prasad It is certified that error appears in the above-identified patent and that said Letters Patent is hereby corrected as shown below:

In the claims:

Col. 17, Ln. 11: After "recording a" and before "for each instance" delete "WIT" and insert --WII--.

Col. 17, Ln. 13: After "wherein each" and before "is represented" delete "WIT" and insert --WII--.

Col. 17, Ln. 14: After "value of the" and before "p" delete "WIT" and insert --WII--.

Col. 17, Ln. 17: Before "is resulted" delete "WIT" and insert --WII--.

Col. 17, Ln. 20: Before "is an XML" delete "WIT" and insert --WII--.

Col. 17, Ln. 22: After "recorded by the" and before "applies" delete "WIT" and insert --WII--.

Signed and Sealed this
Tenth Day of February, 2015

Michelle K. Lee
*Deputy Director of the United States Patent and Trademark Office*